United States Patent Office 2,889,805
Patented June 9, 1959

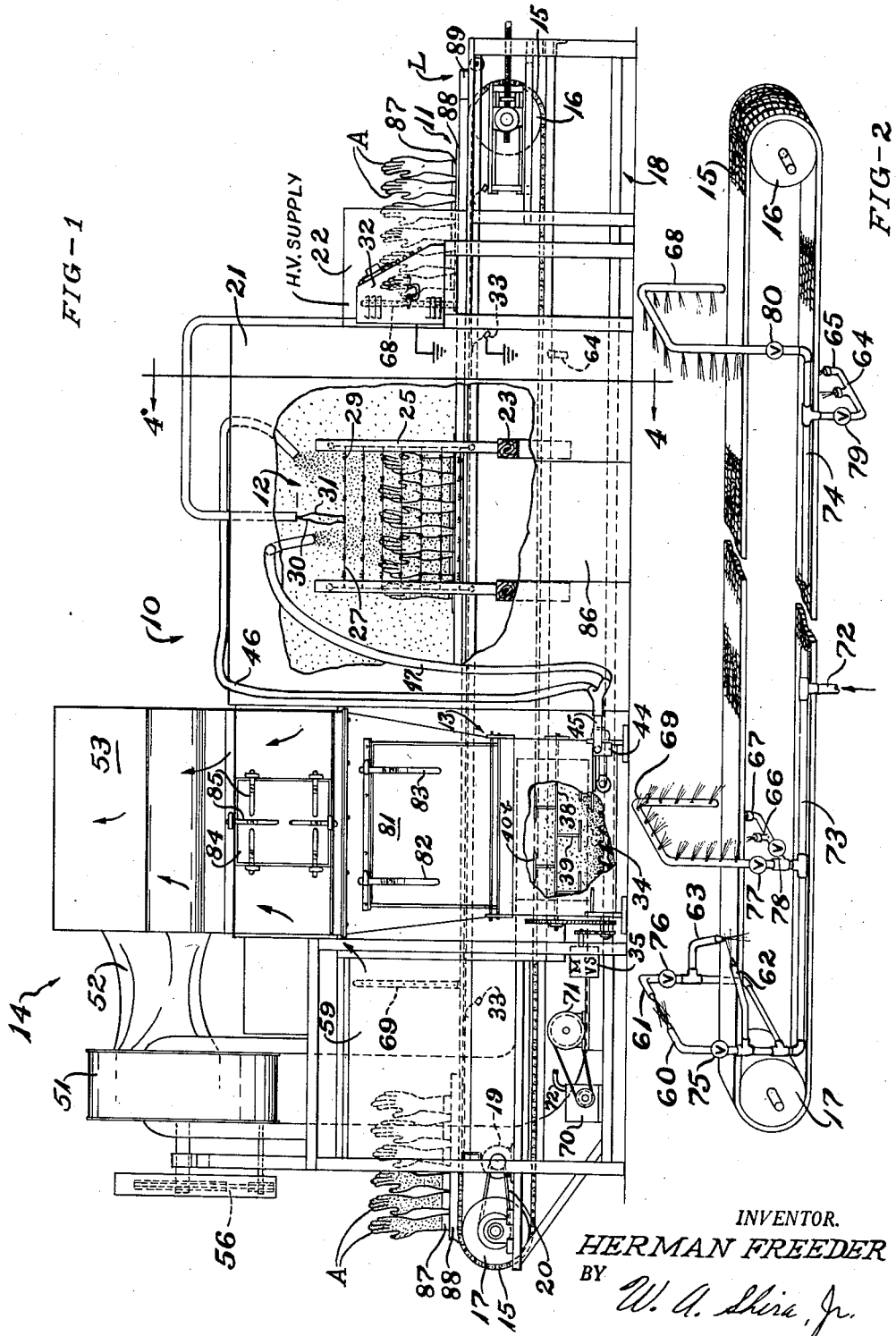

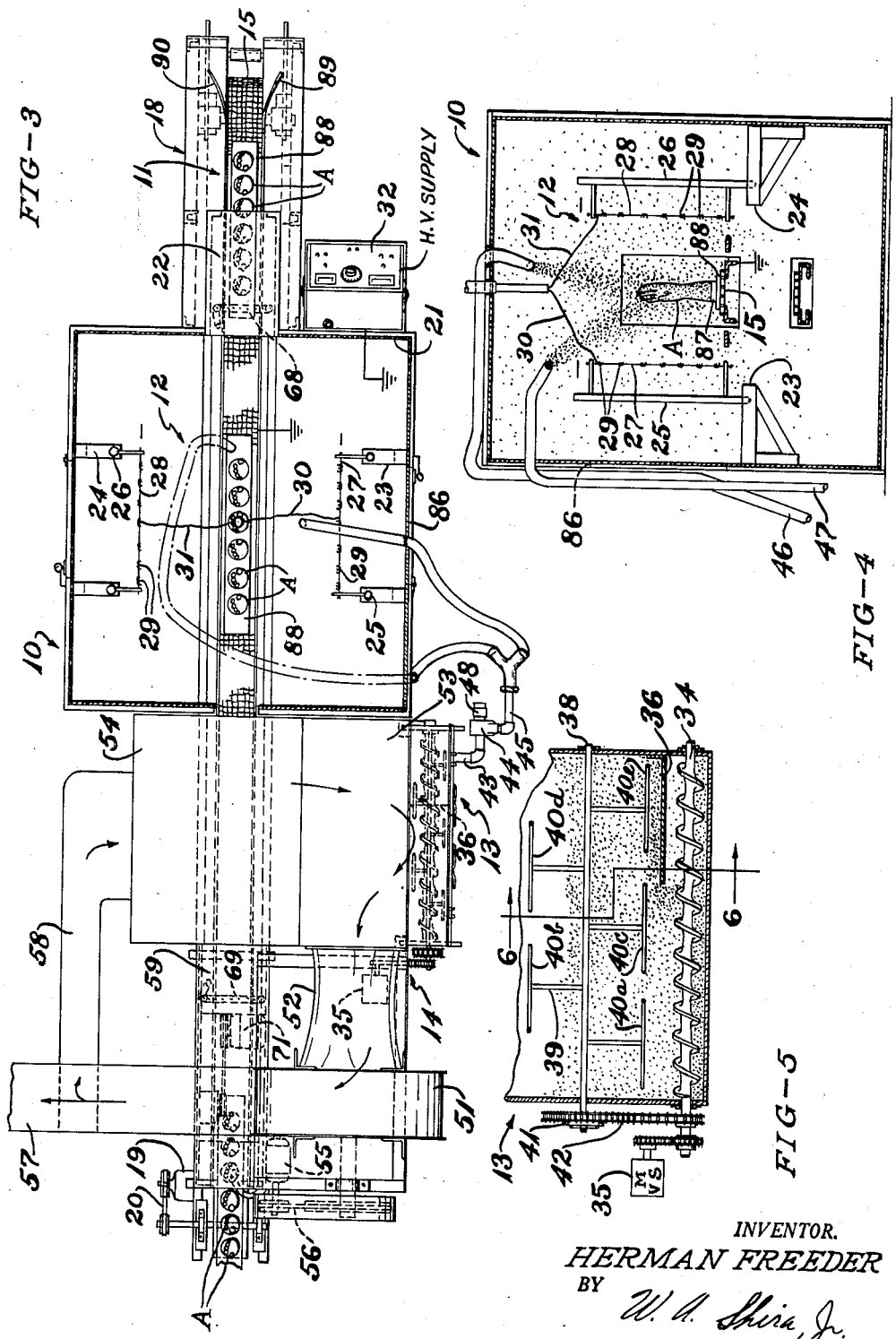

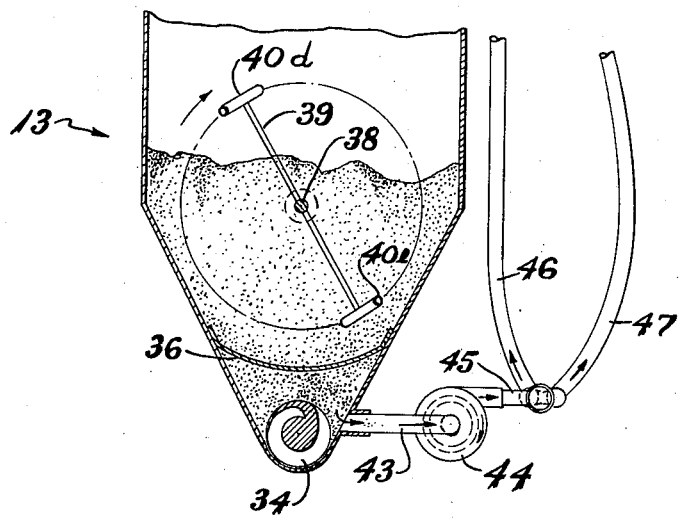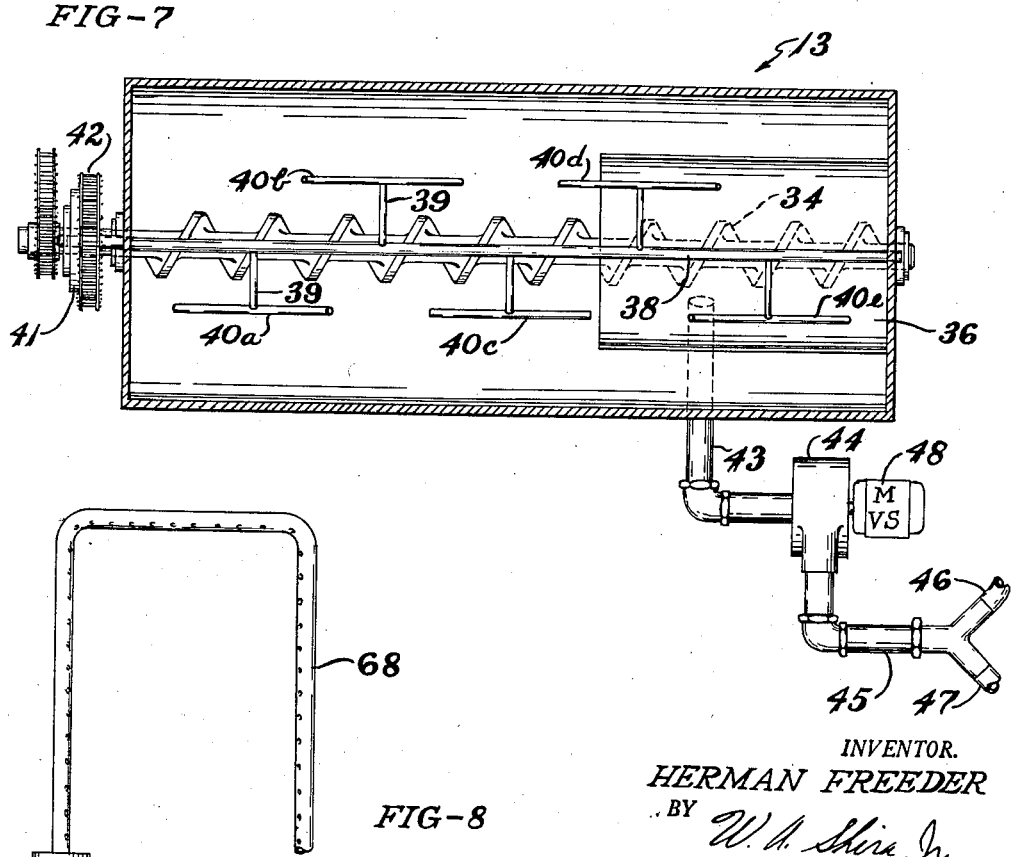

2,889,805

ELECTROSTATIC FLOCKING APPARATUS

Herman Freeder, Akron, Ohio, assignor to The B. F. Goodrich Company, New York, N.Y., a corporation of New York Application January 21, 1955, Serial No. 483,388

12 Claims. (Cl. 118—627)

This invention relates to an apparatus for electrostatically depositing solid material upon articles and, more particularly, to an apparatus for flocking or coating discrete articles with fiber particles through the agency of an electrostatic field of force.

It is desirable to provide many articles, formed of rubber, plastics or other materials, with a coating of relatively short fiber particles commonly known as "flock." Such a coating is, for example, frequently provided on the interior of gloves formed of latex or other elastomers to absorb perspiration, facilitate insertion and removal of the hand, and provide a better "feel." Coatings of this nature are also employed on the interior of galoshes, overshoes and the like for warmth and for other purposes and upon the exteriors for decoration. These coatings, and similar coatings on many other elastomeric articles, have commonly been provided by employing an electrostatic field of force to effect the depositing of the flock or fiber particles on the articles. The apparatus heretofore available for producing coatings in this manner has not, however, been entirely satisfactory since, in many instances, the distribution of the particles comprising the coatings are not uniform over the surfaces of the articles.

The principal object of this invention is to provide an improved apparatus for depositing fiber particles upon articles, such as electrically non-conductive elastomeric articles, through the action of an electrostatic field of force, the apparatus being so constructed and arranged that the resulting coatings on the articles are uniformly distributed thereover and there are no appreciable clusters or clumps of fibers thereon.

Another object of the invention is to provide an improved apparatus for depositing fiber particles upon articles through the action of an electrostatic field of force to which the fiber particles are supplied in a fluid supported stream at a rate in excess of that needed for the articles in the field.

A further object of the invention is to provide an improved apparatus as defined in the preceding paragraph wherein means are provided to recover the excessive fiber particles that pass out of the field of force without being firmly adhered to the articles being coated.

A more specific object of the invention is to provide an improved apparatus of the type defined above wherein the fiber particles are fed from a supply thereof by a mechanism which breaks up lumps or chunks of the particles and supplies the material to the electrostatic field as an air-borne stream of substantially discrete particles with the particle density in the stream being substantially uniform.

An additional object of the invention is to provide an improved apparatus of the type defined above wherein the rate of movement of the air stream transporting the fiber particles and the volume of that stream are readily adjustable to regulate the quantity and distribution of the particles supplied to the electrostatic field of force.

The invenion further resides in certain novel features of the construction and in the combination and arrangements of parts of the apparatus in which the invention is embodied, and further objects and advantages thereof will be apparent to those skilled in the art to which the invention pertains from the following description of the presently preferred embodiment taken in conjunction with the accompanying drawings, forming a part of this application, and in which:

Fig. 1 is a side elevational view of the apparatus with portions of the housing or enclosure broken away to show the flock or fiber feeding mechanism and the relation of the articles being coated to the elements providing the electrostatic field of force;

Fig. 2 is a fragmentary, somewhat schematic, perspective view of the article conveying and cleaning means detached from the other parts of the apparatus;

Fig. 3 is a top view of the apparatus illustrated in Fig. 1 with the upper portion of the housing removed in the region of the electrostatic field to show the arrangement of the conveying means, the field producing elements and the fiber supplying conduits;

Fig. 4 is a transverse sectional view taken substantially on the line 4—4 of Fig. 1 showing the interior of the portion of the enclosure containing the electrostatic field producing elements, certain parts of the apparatus being broken away and others being removed for the sake of clarity;

Fig. 5 is a fragmentary vertical section taken longitudinally through the lower portion of the fiber or flock supply hopper showing the portions of the feeding mechanism provided therein;

Fig. 6 is a fragmentary transverse sectional view through the lower portion of the supply hopper, the view being taken substantially on the line 6—6 of Fig. 5 and being on a larger scale;

Fig. 7 is an enlarged view of the portion of the supply hopper shown in Fig. 6 as seen from the top thereof; and Fig. 8 is an enlarged detached view of a portion of the mechanism employed to provide a curtain of air adjacent entrance and exit openings of the housing or enclosure.

The apparatus here illustrated as the presently preferred embodiment of the invention comprises, as its principal components, an elongated housing or enclosure 10 through which the articles A to be coated or covered are carried by a conveying means 11. Within a portion of the housing or enclosure 10 are electrically conductive discharge means which provide an electrostatic field of force 12 to which fiber particles or flock are supplied from a bin or hopper 13 in an air-borne stream to form a cloud or atmosphere of the particles through which the articles pass so that a large proportion of the particles are deposited on the articles by action of the field of force. After passing through the field of force 12 the articles A and the conveying means 11, while still within the housing or enclosure, are cleaned of excess particles, that have been removed from the field of force but not adhered to the articles, by streams of air and these removed particles are returned to the supply hopper or bin 13 by an air circulation and particle collection apparatus 14. The articles A here illustrated are gloves formed of latex which are preferably dipped in an adhesive prior to introduction into the particle depositing apparatus. It will be understood, however, that the apparatus is not limited to use with, or operation upon, articles of this type nor is it necessary that the articles be formed of latex since the same mechanism and procedures may be utilized with articles of other shapes and/or those formed of other elastomers or of non-elastomeric materials.

The constructional details of the apparatus may be varied but, as here shown, the conveying means 11 is electrically conductive and comprises an endless, perforate, flexible metal band or belt 15 which may be constructed similar to a chain or travelling grate. This conveyor is trained about pulleys or drums 16 and 17 that are rotatably supported at either end of the framework 18 of the apparatus. One of the pulleys or drums, such as 16, preferably has its bearings movably mounted to permit adjustment of the tension on the conveyor, and the other pulley or drum, such as 17, is driven by a motor 19 that is connected with the pulley or drum 17 by a suitable power transmitting means 20 such as a belt or chain. The framework of the apparatus includes suitable metal angle, channel, and plate members bolted, welded or otherwise secured together to provide an elongated base that conveniently may be of table height.

The housing or enclosure 10 is supported upon this base or frame and includes a compartment 21 surrounding that portion of the conveyor 15 adjacent which is positioned the electrostatic field producing elements. This compartment is preferably formed by panels of electrically conductive material and extend substantially from the floor or support for the apparatus to a position well above the conveyor. The end panels of the compartment 21 are provided with openings to accommodate the conveyor and the articles. Preferably, separate openings are provided for the upper and lower reaches or flights of the conveyor 15 with the openings for the lower reach only of sufficient size to permit free passage of the conveyor. The openings for the upper reach or flight of the conveyor are of sufficient height to permit passage therethrough of the articles to be coated while positioned on the conveyor. Preferably, the opening to the compartment 21 through which the articles A enter is provided with a tunnel-like housing or enclosure 22 extending along the conveyor 15 but terminating short of the end thereof so that an exposed portion of the conveyor is available as a loading station L.

The two opposite walls of the compartment 21 on either side of the conveyor 15 are provided on their interiors with pairs of brackets or supports 23, 24, see Fig. 4, and these pairs of brackets are provided with corresponding pairs of vertically extending supporting members, such as 25 and 26, respectively. The pairs of members 25, 26, respectively, support discharge electrodes 27 and 28 on either side of the conveyor adjacent the path of movement of the articles A through the compartment. The electrodes 27 and 28 are formed of electrically conductive material and are either insulated from the supporting members or the latter are themselves formed of insulating material. In the form here shown, the discharge members or electrodes each comprise a plurality of spaced horizontally extending electrically conductive wires provided with spaced barbs or points, such as 29, which may be formed by twisting short lengths of wire about the horizontally extending portions of the discharge elements and leaving the ends of the wire extending towards the opposite discharge electrode.

The several conductive members of the discharge electrodes 27 and 28 are electrically interconnected with each other and the two electrodes are connected by wires, such as 30 and 31, to the output of a suitable source of high potential, low amperage, unidirectional electrical energy which may be of conventional construction and is indicated in the form of a cabinet 32 supported adjacent the tunnel 22. This source of high potential electrical energy may be provided with the usual switches and controls which are well understood and hence need not be here described. The other output terminal of the high potential source 32 is connected to the metal conveyor 15 by suitable means such as one or more straps 33 each of which is provided with a suitable rolling or sliding member contacting the moving conveyor as will be readily understood. The framework 18 of the apparatus is preferably also connected to this other terminal of the electrical source which terminal is maintained at ground potential. Without limitation thereto it may be mentioned, by way of example, that satisfactory results have been obtained by spacing the discharge electrodes 27 and 28 a distance in the order of 13 inches from the articles to be coated and employing an electrical potential in the order of 74,000 volts with the current being in the order of 55 micro-amperes.

The fibers or flock material to be disposed on the articles is supplied to the electrostatic field 12 from the hopper or bin 13 in the form of a uniformly dispersed suspension in a stream or streams of fluid. For this purpose, the sides of the bin or hopper 13 are tapered inwardly adjacent the bottom and the resulting reduced width portion of the hopper is provided with a feed screw or worm 34 which is driven from a suitable source of power. The drive for the feed screw 34 is preferably adjustable to provide different speeds of rotation for the screw. In the form shown, this drive comprises a variable speed electric motor 35 which is connected by a chain with the feed screw 34 and hence the speed of the latter can be varied by varying the speed of the motor 35. Located in the hopper 13 above one end of the feed screw 34 is a transversely extending partition 36 which is impervious and extends from one end of the hopper to a location in the latter spaced from the other end wall thereof. In the illustrated embodiment the length of the partition 36 is somewhat greater than one-third of the length of the hopper, see Fig. 7. This dimension is not, however, critical and may be varied.

Within the hopper or bin 13, and above the partition 36, is a rotatable stirring mechanism comprising a horizontally extending shaft 38 provided at spaced points therealong with radially extending arms 39, the ends of which are provided with rods or members that extend at right angles to the arms. These rods or members, designated 40a, 40b, 40c, 40d and 40e in the drawings, are inclined relative to each other in directions such as to provide a stirring action on the fibers or flock and direct it away from the ends of the hopper. Thus, in the position of the parts illustrated in Fig. 7, the rods or members 40a and 40e are oppositely inclined and each has the end thereof which is proximate to the adjacent end wall of the hopper 13 at a lower elevation than the opposite end. The rods or members 40b and 40d are inclined in opposite directions with the ends thereof remote from the hopper end walls being at lower elevations than the opposite ends, while the rod or member 40c is parallel with the axis of the shaft 38. While five arms 39 and a corresponding number of stirring rods or members have been shown and described, it will be apparent that this number and the angles of the rods or members may be varied from the illustrated construction.

The shaft 38 has a portion extending beyond the bin or hopper 13 and this extending portion is provided with a suitable sprocket wheel 41 connected by a chain 42 to the feed worm or screw 34. Hence, when the motor 35 is energized, the shaft 38 of the stirring means is also rotated thus assisting the flock or other fiber material in the bin or hopper 13 to move past the edge of the partition 36 and this fiber or flock is then moved forwardly at a uniform rate by the feed screw 34.

The discharge opening for the bin or hopper 13 is connected by a pipe or tube 43 to the intake of a centrifugal blower 44. The outlet of the blower 44 is connected to a pipe or tube 45 which, in turn, is connected with branch tubes or pipes 46, 47 that extend into the compartment 21 and terminate adjacent the electrostatic field of force 12 therein. As here shown, one of the tubes or pipes such as 46 is located above and adjacent to the entrance end of the electrostatic field 12 while the other tube or pipe 47 is located above and adjacent one side of the electrostatic field approximately intermediate the ends thereof. This disposition of the supply tubes for the fibers or flock has proved satisfactory but it will be evident that the locations of the tubes may be varied and/or a lesser or greater number may be employed if desired.

The outlet of the bin 13, which is connected with the pipe 43, is disposed beneath the partition 36 and is horizontally spaced from the edge thereof past which the fibers or flock move from the main body of the bin or hopper into the lower portion provided with the feed screw. The rate of material removal by operation of the blower 44 is preferably so regulated that particles are removed thereby only from the region beneath the partition 36 adjacent the blower inlet pipe 43 so that the movement of the fibers or flock downwardly past the edge of the partition 36 and horizontally through the lower portion of the hopper is effected by action of the stirring means and feed screw. The rate of movement of the fibers or flock to the discharge opening is governed by the speed of the screw 34, which is controlled by varying the speed of motor 35, while variation of the speed of the blower 44, and hence variation of the rate of removal of material from the hopper or bin 13, is effected by driving the said blower by a suitable variable speed mechanism which, in the illustrated embodiment, is a variable speed electric motor 48. In addition to its feeding action, the screw 34 also acts to break up lumps or chunks of the flock or fibers and this breaking or separating action upon the fibers or flock is further accentuated by the beating action of the rotor in the centrifugal blower. Hence, the entire mechanism cooperates to provide a well-dispersed fluid-borne stream of fiber particles which are supplied to the electrostatic field of force 12 in a manner to provide a substantially uniform cloud or atmosphere of the particles between the discharge electrodes. In the preferred embodiment, the fluid admitted to the top of the hopper 13 is air and the rate of supply of the fibers or flock to the field of force 12 is preferably in excess of that needed to provide a complete covering or coating on the articles A thus insuring that there will be no bare or thin spots upon the articles.

After leaving the compartment 21 the coated articles A are carried by the conveyor 15 through the air circulation and particle collection portion 14 of the apparatus where excess fiber particles or flock are removed from the articles and conveyor and these removed particles are returned to the supply hopper. This air circulating and fiber collection means is here shown as a second compartment of the housing or enclosure 10 and is formed by suitable closure or plate members extending about the conveyor and upwardly therefrom. This portion of the apparatus includes a fan or blower, indicated at 51, see Fig. 3, the intake 52 of which communicates with a compartment or chamber 53 provided at the top of the bin or hopper 13. The compartment or chamber 53 communicates at the side thereof with the upper portion of a chamber 54 extending upwardly over the conveyor 15. The blower 51 is driven by any suitable means, which is here illustrated as a motor 55 connected to the blower by a suitable power transmission 56. The output of the blower 51 has a portion thereof exhausting to the atmosphere through a conduit such as 57 which may be provided with suitable filter means not shown. The remainder of the output from the blower is connected by conduit or duct means 58 to the lower portion of the enclosure providing the chamber 54, this connection being on the opposite side from that on which the hopper or bin 13 is positioned and at a location beneath the conveyor 15. The construction is such that when the blower 51 is in operation, the path of air flow is substantially as indicated by the curved arrows in Figs. 1 and 3. That is, air is exhausted from the upper portion of the compartment or chamber 54 above the conveyor and moved adjacent the top of the bin or hopper 13 into which the fiber or flock particles are deposited through the action of a suitable baffle, etc., which are not shown but which are conventional in dust collection mechanism. The air then passes through the blower intake 52 with a portion of the air exhausting to atmosphere, as indicated at 57, the remainder being returned through duct 58 to a location beneath the portion of the conveyor within the chamber 54 of the air circulating and particle collection unit 14.

Although the portion of the apparatus just described is effective to return to the supply bin or hopper 13 the excess fiber particles which are suspended in the air or which have been dislodged from the conveyor or coated articles, the velocity of circulation of the air is not itself sufficient to remove all the excess particles resting on the conveyor or those deposited on the articles A but not adhered thereto. Therefore, additional cleaning mechanism is provided to dislodge such excess fiber material so that it can likewise be returned to the supply hopper. For this purpose, the portion of the conveying means extending beyond the chamber or compartment 54 of the air circulating and particle collection portion of the apparatus is surrounded by a tunnel-like enclosure 59 similar to the tunnel 22 and within the tunnel 59 are provided jets of air directed to effect the aforementioned cleaning. Referring now to Figs. 1, 2 and 3, it will be seen that this cleaning mechanism preferably comprises a pair of opposed pipes or jets 60 and 61 located at an elevation above the conveyor 15 and on either side thereof so as to impinge upon the articles A substantially medially of the height thereof. These pipes or jets 60, 61 are connected to a piping system which is also provided with angularly opposed jets 62, 63 positioned to impinge upon the conveyor 15 adjacent the upper reach of the conveyor and sweep it free of particles.

The lower reach of the conveyor 15 may likewise be subjected to the action of air from cleaning jets and in the preferred embodiment such pipes or jets are indicated 64 and 65 as located in the lower portion of the compartment 21 adjacent the location where the lower reach of the conveyor passes therefrom in its return to the pulley 16. Similar pipes or jets 66 and 67 may be provided beneath the upper reach of the conveyor adjacent the point of exit thereof from the compartment or chamber 54. In addition to these cleaning means, the apparatus is also preferably provided with two air curtains or screens to prevent fiber particles or flock remaining suspended in the air from leaving the housing or enclosure. These air curtains or screens are preferably provided by tubes which are substantially inverted, U-shaped and have a plurality of openings or holes at spaced locations therealong. These tubes 68 and 69, one of which is shown to enlarged scale in Fig. 8, are located, respectively, in the tunnel 22 and the tunnel 59 adjacent the entrance to, and exit from, the enclosure or housing 10 with the holes or openings in the tubes directed so that the air issuing therefrom provides a screen or curtain across the openings of the housing.

The tubes 68, 69 and the several air jets 60, 61, 62, 63, 64, 65, and 66, 67 can be supplied with air under pressure from either a single source or from a plurality of different sources. As here shown, these tubes and jets are all supplied from a single air compressor 70 which is driven by a motor 71, the outlet of the compressor being connected by a pipe, such as 72, connected with suitable pipes 73 and 74 which, in turn, are connected to the several jets or tubes as will be apparent in Fig. 2. The pipes and tubes of this system may be provided with suitably located control valves such as 75, 76, 77, 78, 79 and 80 by which the pressure of the air supplied to the several jets and tubes may be regulated. Preferably, the pressure of the air supplied to the tubes 68 and 69 and to the jets 60 and 61 is adjusted to a value that is less than that supplied to jets such as 62, 63, 64, 65, 66 and 67 in order that the air impinging upon the coated articles may not be sufficient to dislodge particles therefrom which have been adhered thereto. The air directed to effect cleaning action directly upon the conveyor may be of higher pressure to effect a more thorough dislodging of the particles. It will be observed that the several air cleaning means are so located that the particles are dislodged from the articles and conveyor within the housing 10 and in a manner such that the particles can be readily returned to the supply bin or hopper 13 for re-circulation.

The side of the supply bin 13 is shown as provided with a door or closure 81 secured by turnable handles or latches 82, 83, which closure may be removed for the purpose of cleaning the mechanism and/or for supplying additional fiber or flock material thereto. Likewise, the portion of the particle collector located about the bin 13 is provided with a removable door or closure member 84 secured in place by turnable handles or latches 85 so that access may be gained to the apparatus through this opening. Similarly, a door or removable panel 86 may be provided in the compartment 21 for the purpose of securing access thereto and/or suitable window or windows may be placed at convenient locations so that the operations within the compartment 21 may be observed.

In employing the apparatus for providing a coating of fiber or flock particles upon rubber or latex gloves, the latter are individually positioned upon forms 87 each having the shape of a glove with a plurality of the forms as, for example, six thereof, supported upon a single base member 88 which is formed of conductive material such as sheet metal or the like. The forms 87 are preferably formed of non-conductive material which may be porcelain, clay, resin or the like. The articles thus supported are dipped in an adhesive which may, for example, be an aqueous solution of resorcinol formaldehyde, and are then placed upon the conveyor 15 at the loading station L. To facilitate placing the articles upon the conveyor, the framework of the apparatus may include vertically extending guide members 89 and 90 on either side of the conveyor, the outer ends of which diverge as shown in Fig. 3. In advance of thus placing the articles upon the conveyor, the several motors of the apparatus will have been placed in operation and the source of electrical potential 32 will have been energized. Consequently, the fiber particles or flock will be supplied to the electrostatic field of force 12 as a uniform, well-dispersed air-borne stream forming a cloud of particles between the discharge electrodes 27 and 28 through which the articles A are carried. The electrostatic field of force is established between these discharge electrodes and the conveying means for the articles, which conveying means includes the base members 88 and the conveyor 15 and this field of force causes the particles to be deposited on the articles A substantially uniformly thereover. The non-conductive nature of the articles and forms insures that no undesired concentration of fiber deposit will be formed adjacent small area projections of the articles, such as the ends of the fingers and the like, as might be the case with electrically conductive articles or forms.

After passing through the electrostatic field 12 where the articles receive the coating of fiber or flock material they then pass through the air circulating and particle collecting portion 14 of the apparatus where excess non-adhered particles are removed from the articles A and particles carried upon the conveying means are dislodged therefrom and returned to the supply hopper 13. The atmosphere or cloud of fiber particles within the compartment 21 is prevented from issuing from the latter through the entrance opening by virtue of the air curtain or screen provided by the tube 68 and a similar function is provided adjacent the exit opening of the apparatus by the tube 69.

As the coated articles pass from the apparatus they may be removed by hand or delivered to another conveying apparatus and may then be subsequently treated, as by vulcanizing the latex, rubber, or other elastomer and the adhesive thereon in the conventional manner, to securely anchor the adhered particles to the articles after which the articles may be stripped from the forms and the latter employed again.

The materials employed for flocking may comprise short length fibers of wool, cotton, rayon or other natural or synthetic fibers and the material on which the fiber or flock is deposited may be latex, rubber or other elastomers or non-elastomeric materials which are non-conductive. The adhesive employed upon the articles may be substances other than the aforementioned aqueous solution of resorcinol formaldehyde and in some instances no adhesive is needed. Moreover, the articles may be in shapes other than gloves as, for example, overshoes, galoshes, rubber panties or other articles on which it is desirable to provide a coating of fiber particles.

Although the apparatus of this invention has been specifically described in considerable detail with respect to the illustrated embodiment, it will be understood that variations may be made in the constructional details by those skilled in the art and that the invention is not limited to the specific materials, dimensions or arrangements of parts herein shown and described except as may be required by the spirit and scope of the appended claims.

Having thus described the invention, I claim:

1. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of said conveying means and including a plurality of interconnected spaced small area projections, means for supplying high potential low amperage unidirectional electrical energy of opposite polarity to said conveying means and to said conductive means thereby providing an electrostatic field of force within the enclosure between the conductive and conveying means through which field the articles to be coated are conveyed, and means to provide an atmosphere of finely divided fiber particles in said enclosure including a supply hopper for such particles, conduit means independent of said conductive means extending from said hopper to a location in said enclosure adjacent to the electrostatic field therein, means in said hopper for agitating the fiber particles therein and delivering them to said conduit, means for creating a moving stream of fluid through said conduit means so that the fiber particles are supplied to said enclosure by the said fluid stream and are deposited on the articles by the electrostatic field of force as the articles move through the latter, and variable speed driving means for said fluid stream creating means controllable independently of the rate of movement of said conveying means to control the rate of supply of the particles to the said enclosure.

2. An apparatus as defined in claim 1 wherein said conveying means includes an endless electrically conductive conveyor, a plurality of electrically conductive form supporting members adapted to be removably carried by said conveyor, and electrically non-conductive forms for the articles to be coated attached to said members and having shapes corresponding to those of the articles whereby the fiber particles deposited on the articles are not concentrated on small area projections of the articles.

3. An apparatus as defined in claim 1 wherein said electrically conductive means includes a plurality of interconnected spaced wires, and the said plurality of small area projections are barbs on said wires at spaced locations therealong providing a plurality of spaced discharge points.

4. An apparatus for electrostatically depositing a coating of fiber particles upon flexible electrically non-conductive articles, the said apparatus comprising an enclosure provided with entrance and exit openings, an electrically conductive conveyor extending horizontally through the said enclosure and exteriorly of the said openings, electrically non-conductive form members shaped to correspond in configuration with the articles removably positioned on the conveyor for supporting and carrying the articles through the enclosure, electrically conductive means within said enclosure extending in vertical planes adjacent both side edges of said conveyor and including a plurality of interconnected small area projections, means for supplying high potential low amperage unidirectional electrical energy of opposite polarity to said conveyor and to said conductive means thereby providing an electrostatic field of force within the enclosure between the conductive means and the conveyor through which field the articles to be coated are conveyed, and means to provide an atmosphere of finely divided fiber particles in said enclosure including a supply hopper for such particles, a rotatable feed screw operable at different speeds to deliver fiber particles from the supply hopper at a controlled rate, and means independent of said conductive means providing a transversely confined moving stream of a fluid extending from said feed screw to a location in said enclosure adjacent to the electrostatic field therein whereby the fiber particles are carried from said feed screw to said enclosure by the said fluid stream and are deposited on the articles by the electrostatic field of force as the articles move through the latter with the said non-conductive form members preventing excessive concentration of fiber particles on small area projections of the articles.

5. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of said conveying means, means for supplying high potential low amperage unidirectional electrical energy of opposite polarity to said conveying means and to said conductive means thereby providing an electrostatic field of force within the enclosure between the conductive and conveying means through which field the articles to be coated are conveyed, and means to provide an atmosphere of finely divided fiber particles in said enclosure including a supply hopper for such particles, a rotatable feed screw operable to deliver fiber particles from the supply hopper, conduit means independent of said conductive means extending from said feed screw to a location in said enclosure adjacent to the electrostatic field therein, means for creating a moving stream of fluid through said conduit means, and variable speed driving means for said fluid stream creating means controllable independently of the rate of movement of said conveying means whereby the fiber particles are carried from said feed screw to said enclosure by the said fluid stream and are deposited on the articles by the electrostatic field of force as the articles move through the latter, the rate of supply of the particles to the said enclosure being controlled by altering the speed of said variable speed means.

6. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of said conveying means, means for supplying high potential low amperage unidirectional electrical energy of opposite polarity to said conveying means and to said conductive means thereby providing an electrostatic field of force within the enclosure between the conductive and conveying means through which field the articles to be coated are conveyed, and means to provide an atmosphere of finely divided fiber particles in said enclosure including a supply hopper for such particles, a rotatable feed screw operable to deliver fiber particles from the hopper, variable speed driving means connected to said screw, conduit means independent of said conductive means extending from said screw to a location in said enclosure adjacent to the electrostatic field therein, means for creating a moving stream of fluid through said conduit means, and variable speed driving means for said fluid stream creating means controllable independently of the rate of movement of said conveying means whereby the fiber particles are carried from the feed screw to said enclosure by the said fluid stream and are deposited on the articles by the electrostatic field of force as the articles move through the latter, the volume and rate of supply of the particles being controlled by altering the speeds of said variable speed means.

7. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of said conveying means, means for supplying high potential low amperage unidirectional electrical energy of opposite polarity to said conveying means and to said conductive means thereby providing an electrostatic field of force within the enclosure between the conductive and conveying means through which field the articles to be coated are conveyed, means to provide an atmosphere of finely divided fiber particles in said enclosure including a supply hopper for such particles, conduit means independent of said conductive means extending from said hopper to a location in said enclosure adjacent to the electrostatic field therein, variable speed means controllable independently of the rate of movement of said conveying means for creating a moving stream of air through said conduit means so that the fiber particles are supplied to said enclosure by the said air stream at a controlled rate and are deposited on the articles by the electrostatic field of force as the articles move through the latter, air blast means positioned to remove excess fiber particles from said conveying means and articles after passage through said field, and duct means to return the removed particles to said hopper.

8. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of a portion of that part of the said conveying means within the enclosure, means for supplying high potential low amperage unidirectional electrical energy of opposite polarity respectively to said conveying means and to said conductive means thereby providing an electrostatic field of force within the part of the enclosure between the conductive means and conveying means through which field the articles to be coated are conveyed, means to provide an atmosphere of finely divided fiber particles in said enclosure in the region of said field including a supply hopper for said particles, conduit means independent of said conductive means extending from said hopper to a location in said enclosure adjacent to the electrostatic field provided therein, variable speed means controllable independently of the rate of movement of said conveying means creating a moving stream of air through said conduit means so that the fiber particles are supplied to the electrostatic field in said enclosure at a controlled rate and are deposited on the articles by the electrostatic field of force as the articles move through the latter, air emitting means providing a curtain of air adjacent said entrance and exit openings of the enclosure, air blast means positioned to remove excess fiber particles from said conveying means and articles after passage of the latter through said field, and means including intercommunicating ducts extending from said enclosure to said hopper for returning to the latter excess fiber particles in the former.

9. An apparatus for electrostatically depositing a coating of fiber particles upon flexible electrically non-conductive articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically non-conductive form members shaped to correspond with the articles removably positioned on said conveying means for supporting and carrying the articles through the enclosure, air emitting means providing a curtain of air transversely of said conveying means adjacent said entrance and exit openings, electrically conductive means within said enclosure extending in vertical planes adjacent both side edges of a portion of that part of the said conveying means and the forms thereon which are within the enclosure, means for supplying high potential low amperage unidirectional electrical energy of opposite polarity respectively to said conveying means and to said conductive means thereby providing an electrostatic field of force within the part of the enclosure between the conductive means and conveying means through which field the supported articles to be coated are conveyed, means to provide an atmosphere of finely divided fiber particles in said enclosure in the region of said field including a supply hopper for said particles, conduit means extending from said hopper to a location in said enclosure adjacent to the electrostatic field therein, means including a variable speed blower controllable independently of the rate of movement of said conveying means creating a moving stream of air through said conduit means so that the fiber particles are supplied to the electrostatic field in said enclosure by the said air stream at a controlled rate and are deposited on the articles by the electrostatic field of force as the articles move through the latter, air blast means positioned to remove excess fiber particles from said conveying means and articles after passage of the latter through said field, and means including air circulating mechanism and intercommunicating ducts connected to said enclosure and said hopper for returning to the latter excess fiber particles in the former.

10. An apparatus for electrostatically depositing a coating of fiber particles upon articles, the said apparatus comprising two intercommunicating enclosures, electrically conductive conveying means extending horizontally through entrance and exit openings in said enclosures and exteriorly of the enclosures for conveying therethrough the articles to be coated, electrically conductive means within one of said enclosures extending in vertical planes adjacent both side edges of that part of the said conveying means within the said one enclosure, means for supplying high potential low amperage unidirectional electrical energy of opposite polarity respectively to said conveying means and to said conductive means thereby providing an electrostatic field of force within the part of the said one enclosure between the conductive means and conveying means through which field the articles to be coated are conveyed, means to provide an atmosphere of finely divided fiber particles in said one enclosure in the region of said field including a normally closed supply hopper for said particles, conduit means extending from the lower portion of said hopper to a location in said one enclosure adjacent to the electrostatic field therein, variable speed means controllable independently of the rate of movement of said conveying means creating a moving stream of air through said conduit means so that the fiber particles are supplied to the electrostatic field in said one enclosure by the said air stream and are deposited on the articles by the electrostatic field of force as the articles move through the latter, air blast means positioned to remove excess fiber particles from said conveying means and articles after passage of the latter through said field, means emitting air transversely of said conveying means adjacent the said enclosure openings to provide curtains of air preventing fiber particles suspended in air from leaving said enclosures, and means including air circulating mechanism and intercommunicating ducts connected to said other enclosure and to the upper portion of said hopper for returning to the latter excess fiber particles carried into the former.

11. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, electrically conductive means within said enclosure extending in vertical planes adjacent both side edges of said conveying means, means for supplying high potential low amperage unidirectional electrical energy of opposite polarity to said conveying means and to said conductive means thereby providing an electrostatic field of force within the enclosure between the conductive and conveying means through which field the articles to be coated are conveyed, means to provide an atmosphere of finely divided fiber particles in said enclosure including a supply hopper for such particles having a discharge opening of less area than the area of the bottom of the hopper, a partition in said hopper adjacent the bottom thereof extending above said discharge opening and terminating in spaced relationship from a wall of the hopper thereby providing a passage to the discharge opening for material in the hopper, a rotatable feed screw in said hopper in the space between the bottom of the latter and said partition, the said screw being operable to advance fiber particles passing the partition to a location adjacent the hopper discharge, a centrifugal blower provided with inlet and discharge openings, variable speed driving means for said feed screw and blower controllable independently of the rate of movement of said conveying means thereby providing a controlled rate of movement of fiber particles from said hopper, and conduit means independent of said conductive means connecting the inlet of said blower to the hopper discharge opening and the blower discharge to locations in said enclosure adjacent to the electrostatic field therein, whereby the fiber particles are supplied to said enclosure at a controlled rate and well dispersed in an air stream and are deposited on the articles by the electrostatic field of force as the articles move through the latter.

12. An apparatus for electrostatically depositing a coating of fiber particles upon articles, the said apparatus comprising an enclosure provided with entrance and exit openings, electrically conductive conveying means extending horizontally through the said enclosure and exteriorly of the said openings for conveying the articles to be coated from a loading station exteriorly of the enclosure through the latter, means emitting air transversely of said conveyor means adjacent said entrance and exit openings thereby providing curtains of air for said openings, electrically conductive means within said enclosure extending in vertical planes adjacent both side edges of said conveying means, means for supplying high potential low amperage unidirectional electrical energy of opposite polarity to said conveying means and to said conductive means thereby providing an electrostatic field of force within the enclosure between the conductive and conveying means through which field the articles to be coated are conveyed, means to provide an atmosphere of finely divided fiber particles in said enclosure including a normally closed supply hopper for such particles having a discharge opening adjacent the bottom of the hopper of less area than the area of the bottom of the hopper, a partition in said hopper adjacent the bottom thereof extending above said discharge opening and terminating in spaced relationship from a wall of the hopper thereby providing a passage to the discharge opening for material in the hopper, a rotatable feed screw in said hopper in the space between the bottom of the latter and said partition, the said screw being operable to advance fiber particles passing the partition to a location adjacent the hopper discharge, a centrifugal blower provided with inlet and discharge openings, means for driving said feed screw and blower at selected speeds independently of the rate of movement of said conveyor means, means connecting the inlet of said blower to the hopper discharge opening and the blower discharge to locations in said enclosure adjacent to the electrostatic field therein whereby the fiber particles well dispersed in an air stream are supplied to said enclosure at a controlled rate and are deposited on the articles by the electrostatic field of force as the articles move through the latter, air jet means positioned to remove excess fiber particles from said articles and said conveying means, and means including air circulating mechanism and intercommunicating ducts connected to said enclosure and to said hopper for returning to the latter excess fiber particles in the former.

References Cited in the file of this patent

UNITED STATES PATENTS

| | | |
|---|---|---|
| 1,659,179 | Wilson | Feb. 14, 1928 |
| 1,710,747 | Smith | Apr. 30, 1929 |
| 1,876,251 | Lehman | Sept. 6, 1932 |
| 1,952,502 | Kinkead | Mar. 27, 1934 |
| 1,989,270 | Clark | Jan. 29, 1935 |
| 2,334,648 | Ransburg et al. | Nov. 16, 1943 |
| 2,358,138 | Blanchard et al. | Sept. 12, 1944 |
| 2,389,657 | Faris et al. | Nov. 27, 1945 |
| 2,402,183 | Rowe et al. | June 18, 1946 |
| 2,447,374 | Smyser | Aug. 17, 1948 |
| 2,466,906 | Miller | Apr. 12, 1949 |
| 2,528,087 | Schoepe | Oct. 31, 1950 |
| 2,560,047 | York et al. | July 10, 1951 |
| 2,602,418 | Paasche | July 8, 1952 |
| 2,608,176 | Jenkins et al. | Aug. 26, 1952 |
| 2,625,590 | Peeps | Jan. 13, 1953 |
| 2,770,210 | Miller | Nov. 13, 1956 |